United States Patent [19]

Shulman et al.

[11] Patent Number: 4,786,810

[45] Date of Patent: Nov. 22, 1988

[54] SOLID STATE COUNTING SYSTEM FOR BETA AND GAMMA ISOTOPES OF ALL ENERGIES

[75] Inventors: Seth D. Shulman, Washington, D.C.; Orren P. Whiddon, Gaithersburg, Md.

[73] Assignee: Bioscan, Inc., Washington, D.C.

[21] Appl. No.: 901,612

[22] Filed: Aug. 29, 1986

Related U.S. Application Data

[63] Continuation-in-part of Ser. No. 726,247, Apr. 23, 1985, Pat. No. 4,682,035.

[51] Int. Cl.$^4$ ............................................. G01T 1/24
[52] U.S. Cl. .................... 250/370.01; 250/328
[58] Field of Search ............... 250/328, 364, 370 R, 250/432 R, 491.1, 392, 388, 370 K, 336.1; 422/68, 71, 104, 102, 101

[56] References Cited

U.S. PATENT DOCUMENTS

| | | | |
|---|---|---|---|
| 3,898,460 | 8/1975 | Noakes et al. | 250/328 |
| 4,021,670 | 5/1977 | Noakes | 250/328 |
| 4,482,522 | 11/1984 | Baudisch et al. | 422/104 |
| 4,682,035 | 7/1987 | Shulman | 250/370 K |

Primary Examiner—Janice A. Howell
Assistant Examiner—Constantine Hannaher
Attorney, Agent, or Firm—Burns, Doane, Swecker & Mathis

[57] ABSTRACT

A radiation detection apparatus designed to permit the use of samples of various types and sizes. The apparatus comprises a sample housing fixed to the apparatus and defining a fixed opening adjacent a radiation detection element. Sample containers and sample holders are removably supportable in the sample housing. Sample vials and dry sample containers of different sizes are positionable in said sample holders to provide a sample at a fixed distance from the detection element. Also, a dry sample container and a filter sample holding device usable with the apparatus, are disclosed.

59 Claims, 7 Drawing Sheets

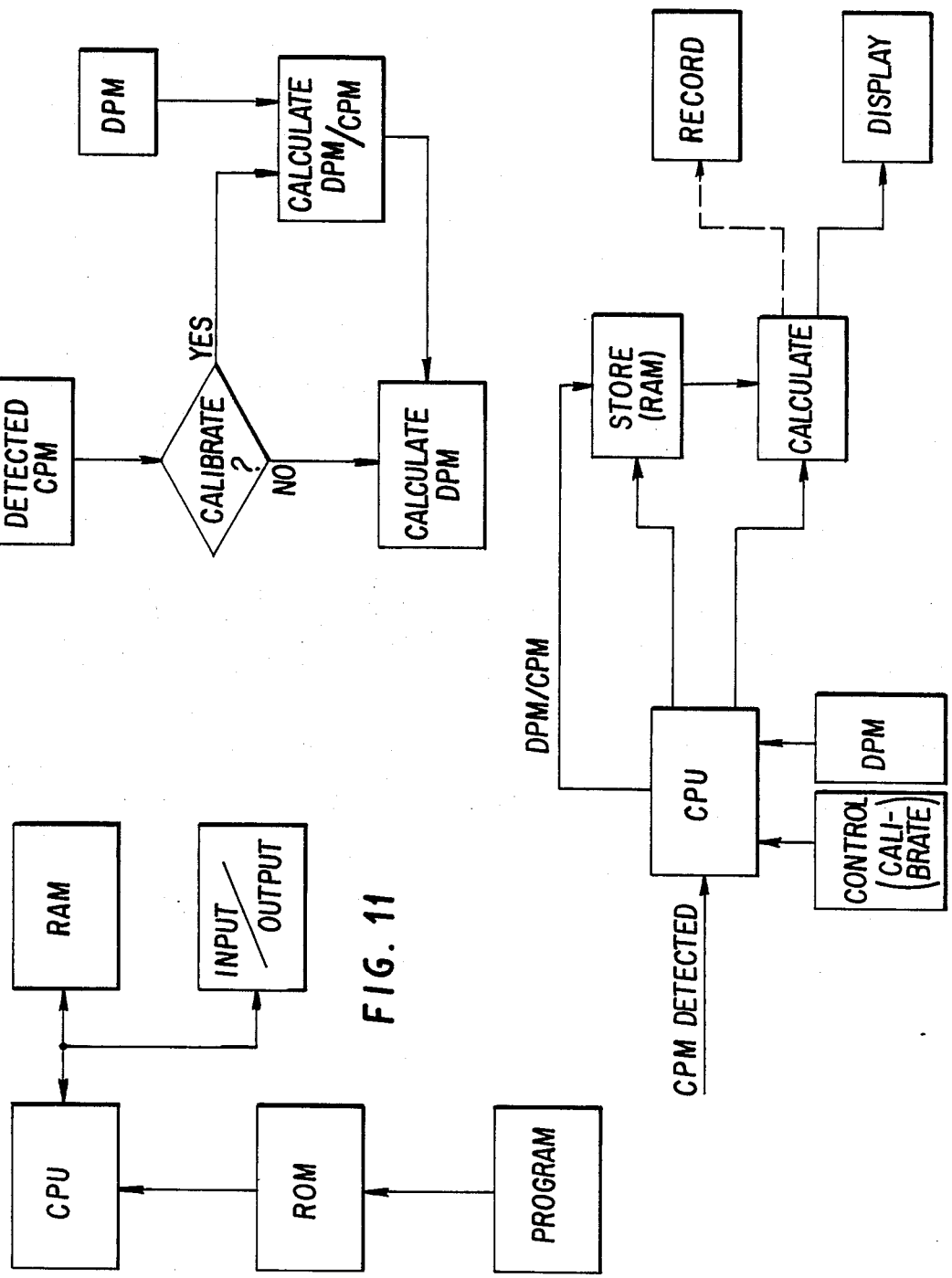

SOLID STATE COUNTING SYSTEM FOR BETA AND GAMMA ISOTOPES OF ALL ENERGIES

RELATED APPLICATIONS

The present aplication is a continuation-in-part application of U.S. patent application Ser. No. 726,247, to Shulman, filed on Apr. 23, 1985, now U.S. Pat. No. 4,682,035.

BACKGROUND OF THE INVENTION

I. Field of the Invention

This invention relates generally to the measurement of radioactivity of a sample in a container or on a filter and, more particularly, to a new and improved electronic method and apparatus for quantitatively measuring the radioactivity of an individual sample in a laboratory environment.

In the biological and medical sciences, certain radioisotopes are frequently used as tracers in tests and experiments in order to detect minute quantities of certain biochemicals present in test samples. For example, the radioisotope $^{32}P$, is commonly used by researchers in these fields to label genetic material (DNA/RNA) and proteins. Frequently, it is required to know the precise amount of a radioisotope contained in various test samples. Quantitative measurements of the amount of radioactive material present in a test sample usually are expressed as an activity in disintegrations per minute. These measurements provide valuable information both in preparing the radio-labelled chemicals and in measuring an amount of radio-labelled material recovered from a system under investigation. Measurements of the activity of a sample also are needed to insure the safety of personnel handling the radio-isotopes.

II. Description of the Prior Art

At the present time, most measurements of activity are obtained from scintillation counting or from Geiger counting. Scintillation counting uses photomultiplier tubes to detect photons produced in a scintillation medium in response to absorption by the medium of beta and gamma radiation. Many of the photons emitted from the scintillation medium are incident upon a photocathode of a multiplier phototube. These photors are converted to photoelectrons and are multiplied in number at a succession of phototube electrodes, called dynodes, the output of which is a measurable electrical pulse related to the incident radiation.

Liquid scintillation counters operate on the same basic principle as scintillation counters, except that the scintillation medium is a liquid into which is dissolved, suspended or otherwise intermixed the radioactve sample being tested. Radioactive emissions of a sample are measured by collecting photons emitted from the scintillation medium and generating photoelectrons responsive thereto to produce electrical pulses related to the incident beta and gamma radiation.

Scintillation and liquid scintillation counting require special sample preparation and the use of special sample containing vials in order to provide a quantitative measure of the amount of radioactive material present in a particular sample. Accordingly, an extra material handling step, involving a transfer of radioactive material into one of the special vials, is required when using these techniques. This transfer step is undesirable, for it is accompanied by an element of error in the measurement of material transferred to the vials. When this measurement error is added to the error inherent to the particular experiment or test technique being utilized, further uncertainty as to the accuracy of the quantitative data obtained from the sample results. Furthermore, the preparation of even a small amount of material for scintillation counting results in the loss of that material for further experimentation. In many cases, where only a very limited quantity of material is available, this loss may be unacceptable.

Several manufacturers produce sophisticated instruments for both beta and gamma radiation counting. Generally, these instruments are designed to count large numbers of radioactive samples in an automated mode. These instruments generally include many features such as multiple sample carriers capable of holding hundreds of individual samples of a prescribed design, multi-user protocols for automatically altering data manipulation from one set of samples to the next, and advanced calibration and correction techniques for obtaining more accurate quantitative data. Needless to say, such devices are complex and expensive.

Geiger counters are generally used when counting small numbers of samples. These counters provide a simpler but much less reliable means for measuring an approximate activity of a radiation emitting sample. Geiger counters use gas filled tubes the contents of which are ionized by incident radiation to produce an electronic signal which registers on a meter or in an audio circuit. The magnitude of the electronic signal is proportional to the amount of radiation impinging upon the gas filled tubes. Commercial Geiger counters are generally hand held devices whose quantitative accuracy is limited by uncertainties in the geometrical positioning of the sample relative to the detector and the absence of careful calibration techniques. However, the instruments are very useful in determining the presence and/or location of radioactivity and in determining an approximate activity of the sample for safe handling considerations. Geiger counters are also helpful in assessing the progress of certain chemical reactions or experiments.

In most laboratories, and in most biotechnology laboratories in particular, the choice of radioactivity counting instrumentation is governed by the number of samples to be counted, the required accuracy of the results, the amount of sample available for analysis, and the availability of the instruments. Geiger counters are available in almost all laboratories which handle radioisotopes as a safety precaution for monitoring spilled or airborne radioactive materials. As a result quick accurate approximate determinations at the laboratory bench are generally made using Geiger counters despite the limited degree of measurement accuracy they provide.

Scintillation or liquid scintillation counters are available in most laboratories only on a shared basis. Because of their relative size and cost, these instruments are generally located in one area which may be some distance from a researcher's workbench. Therefore, these instruments tend to be used only when a substantial number of samples have been accumulated for counting. Samples are generally loaded into an available test tube rack of an automatic sample handler, desired counting parameters are selected, and the samples are left in the counting machine to be counted in turn. Data obtained from the radiation counting is generally recorded by a printing device. The actual counting may occur many hours following the insertion of the samples into the machine and often the results are not available until the following day. While it is possible to count one or several samples in a scintillation or liquid scintillation counter, to do so is a tedious procedure which is infrequently undertaken. In order to count small numbers of samples, the current automatic sequence of the counting device must be interrupted, the samples inserted and counted, and then the instrument returned to the correct position in the automatic counting sequence. Errors in material handling and machine operation may result in lost counting time causing delays of many hours in obtaining the data from the automated runs with larger numbers of samples.

OBJECTS AND SUMMARY OF THE INVENTION

In view of the foregoing it is an object of the invention to provide an improved, relatively simple and inexpensive radiation detection apparatus in which individual samples in different types and sizes of containers can be positioned accurately relative to a radiation detector for quantitative measurement of the radioactivity therein.

It is a further object of the invention to provide an improved radiation detection apparatus for the quantitative determination of radioactivity of a sample, particularly for detecting radioactivity from beta and gamma emitting isotopes with various emission energies.

It is another object to provide an improved radiation detection apparatus which provides accurate and reproducible sample positioning geometry for any given type of sample and sample container employed with the apparatus.

Yet another object of the present invention is to provide an improved radiation detection apparatus in which samples on filters can be accurately positioned for radiation measurement without the need for additional instruments or transfer operations.

Still another object is to provide an improved radiation detection apparatus which requires little or no special preparation or handling of samples.

Another object of the present invention is to provide an improved radiation detection apparatus which has improved interaction between a detection element and a sample.

Still yet another object is to provide an improved radiation detection apparatus which eliminates the need for a container through which radiation from the sample must pass before reaching a detection element.

The foregoing and further objects and advantages are provided in accordance with the present invention through provision of a novel method and related apparatus in which different types of individual samples such as liquid samples, samples deposited on filters, and dried samples can be positioned accurately relative to a radiation detector for quantitative measurement of the radioactivity therein. Being relatively simple to use and inexpensive to produce, the present invention provides a laboratory tool which can be made available to individual researchers to permit them to analyze a variety of different types of radioactive samples accurately and rapidly and to quantitatively measure the radiation emissions of a variety of radioisotopes with emissions over a wide range of energy levels.

The method of the invention includes the steps of detecting radiation emitted from a sample of known activity and volume and generating responsive thereto a first radiation emission characteristic, comparing the first radiation emission characteristic with the known activity for the sample and generating a calibration constant for the test procedure, detecting radiation emitted by an unknown radiation emitting sample of known volume and generating a radiation emission characteristic thereto, comparing the radiation emission characteristic for the unknown sample with the calibration constant to obtain a corrected radiation emission characteristic indicative of a quantitative measure of the activity of the unknown radiation emitting sample, and displaying the corrected measure of activity obtained for the unknown sample. No special preparation or processing of the sample, such as combining it with liquid or other material or drying it on a special substrate, is required although for low energy beta emitting samples such as $^3H$, $^{14}C$, and $^{35}S$, a drop of the sample may be dried on a special disposable sample container. Therefore, very little or no portion of the sample is consumed or destroyed during the course of radiation emissions detection.

The apparatus of the invention pertains to an inexpensive, compact, bench top radiation detection apparatus capable of measuring the radiation in samples placed in any of a plurality of different sized and shaped containers through the provision of removable sample holders configured to receive different sample containers. Thus, the apparatus can measure the radiation from samples in the form of a liquid in a vial when the energy of the emissions are sufficient to penetrate the wall of the vial, as in the aforementioned parent application, as well as from samples which have been deposited and dried on the surfaces of specially shaped disposable sample containers which can be inserted into an associated sample holder and positioned at a fixed distance from a radiation detector with the sample in direct communication with the detector. This latter arrangement enables an efficient and accurate measurement to be made due to the absence of a container wall between the sample and the detector. It also allows the apparatus to be used to detect and measure low energy emissions.

Samples that are deposited on filters can be measured in the apparatus of the instant invention by merely placing a filter with a deposited sample to be measured in a special filter sample holder which serves both as the container and the sample holder and is directly inserted into the radiation detection apparatus without a separate sample holder. The filter sample holder positions the filter sample at a fixed distance from the detector element enabling an accurate measurement to be made.

The radiation detector is positioned near the sample receiving zone and produces a signal representative of a radiation emission characteristic for a sample of radiation emitting material. The radiation emission characteristic is analyzed and selectively compared to at least one value stored in an addressable memory (e.g., a random access memory or RAM) of an electronic processing circuit.

The processing circuit includes a microprocessor having pre-programmed data processing information stored in a memory (e.g., a read only memory or ROM) for processing radiation emission data obtained from the radiation detector. The processing circuit communicates with a data input means in the form of a digital keyboard through which data may be entered and stored in the addressable memory. Selection of an appropriate command from the data input means provides for display of a radiation emission characteristic by an alpha-numeric liquid crystal display (LCD) positioned adjacent the data input means.

A solid state detector such as a PIN photodiode or an avalanch diode preferably is used as a radiation detector, although a proportional counter may be used for extremely low energy emissions from samples marked with tritium ($^3$H). PIN photodiodes exhibit rapid response to high speed pulsed radiation and provide a large sensitive area for beta and gamma radiation emissions. A PIN photodiode with a plastic surface over the active area as such photodiodes are normally commercially available is responsive to high energy (~1 MeV) beta and (~100 keV) gamma radiation emissions. Radiation emissions of this energy level accompany decay of $^{32}$P, $^{125}$I, and other high energy isotopes used in biological and medical research. In accordance with one feature of the present invention, the detector preferably is responsive to low energy radiation emitted from carbon 14 ($^{14}$C), Sulphur 35 ($^{35}$S), and tritium ($^3$H) isotopes as well as the high energy isotopes. By removing the plastic cover over the active surfcce of a photodiode, for example, the snesitivity is increased so as to be useful for detection of low energy emissions from at least $^{14}$C and $^{35}$S (e.g. about 30 KeV betas) when the disposable sample holder is used and the emissions do not pass through the container.

An electrical connector located along a back end of the apparatus may be provided for communication between the microprocessor and at least one of a family of expansion modules. These expansion modules may augment or re-define a function of certain components of the apparatus. When additional ROM beyond that provided internally for the microprocessor is required for operation of a particular expansion module, program control of the microprocessor is directed by the expansion module. When the expansion module directs operation of the microprocessor, the module may assume control of the data input means and re-define various aspects of its functions.

The family of expansion modules includes a high performance liquid chromatography (HPLC) flow detector and a printer. The HPLC flow detector includes a flow cell, radiation detector, analog circuitry, and an additional microprocessor program stored in a ROM. The microprocessor, data input and data display means are used from the radiation detection apparatus. The ROM of the expansion module directs operation of the microprocessor to obtain quantitative data concerning radiation emissions of a sample passing through the flow detector.

The printer module includes an inexpensive dot matrix thermal printer. Selection of an appropriate printer command and data transmission rate directs the printer to provide hard copy of output data from the radiation detection apparatus. Information such as the date and time of data analysis may be communicated to the printer through the data input means of the apparatus and included in the hard copy of the data.

It is to be understood that in this summary of the invention, as in the drawing figures and the detailed description hereinbelow, only a preferred embodiment of the radiation detection apparatus is set forth. The scope of the present invention is not to be limited to this preferred embodiment, for alterations could be made, for example, in response to changes in the techniques used to take samples and the materials used in testing procedures. Such alterations are deemed to fall within the scope of the present invention.

BRIEF DESCRIPTION OF THE DRAWING

Preferred embodiments of the invention are discussed in the following detailed description which should be considered in connection with the features in the accompanying drawing, in which:

FIGS. 11 and 12 are block diagrams illustrating operational steps of one embodiment of the invention; and FIG. 13 is a block diagram illustrating a second embodiment of the invention.

Similar reference characters refer to similar elements throughout the several views of the drawing.

All drawings are shown for illustrative purposes only and it will be appreciated that a wide variety of configurations or modifications to this basic concept are possible and fall within the general scope of this invention

DETAILED DESCRIPTION OF THE PREFERRED EMBODIMENT

A preferred embodiment of a radioactivity measurement machine for laboratory analysis of individual samples in different types and sizes of sample containers is illustrated in its various aspects in FIGS. 1 to 13.

It will be appreciated that the apparatus is generally constructed and operable in accordance with the description set forth in U.S. patent application Ser. No. 726,247 except, as will be seen hereinafter, the sample holder is removable so that it can be changed to receive different sample containers. In addition special sample containers and a special detector are disclosed.

Figure 1:
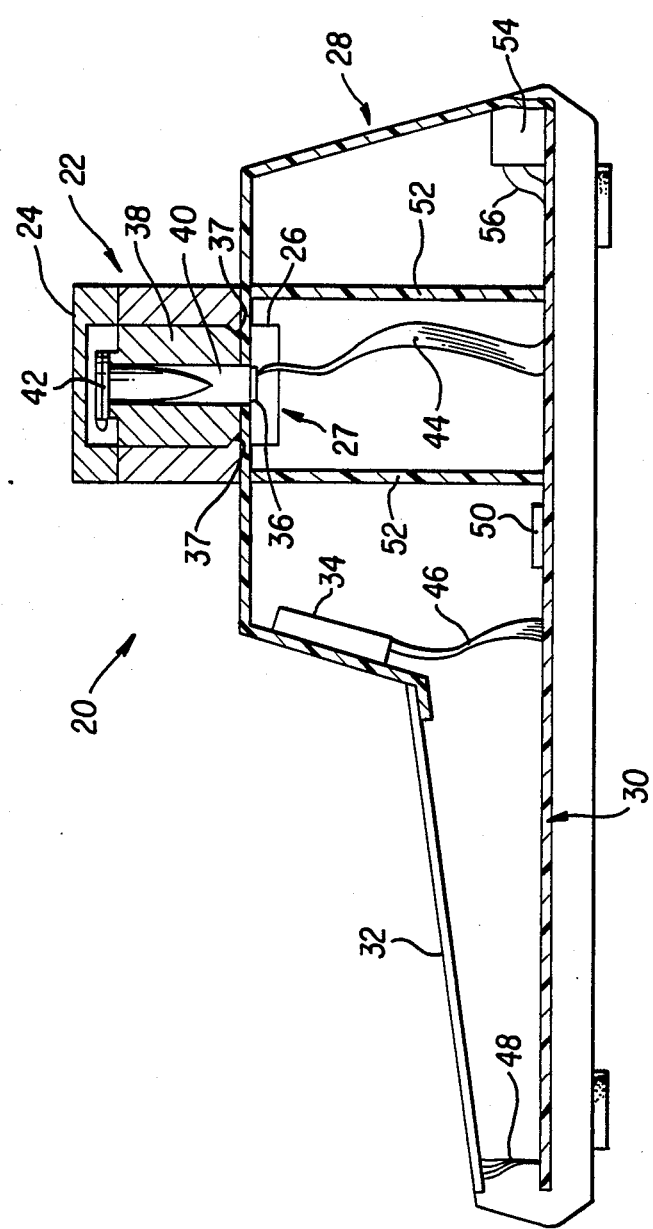
FIG. 1 is a sectional view of a radiation detection apparatus in accordance with the present invention.

Referring now to FIG. 1, there is depicted a radiation measuring apparatus designated generally at 20 having a sample housing 22, a cover 24, detector subassembly 26, a main housing 28, a main printed circuit board 30, a data input device 32, and a data display 34. The sample housing 22 can either be a substantially light-tight enclosure formed within the apparatus or may be a separate enclosure on or near the apparatus. The housing 22 has an opening leading to a radiation detection zone generally indicated at 27. The detector subassembly 26 is positioned in the detection zone 27 and contains a radiation detector 36. In the alternative, the housing 22 may be formed in the housing of the apparatus 20 and the opening in the housing may extend into the apparatus so that the detector 36 may be mounted on the printed circuit board 30.

The sample housing opening defines a space for receiving a sample holder 38. The inner wall of the housing opening converges toward the radiation detection zone at the end near the detector subassembly 26 as indicated at 37. The sample holder 38 defines a sample receiving zone 40 in which a sample can be placed either directly as discussed hereinafter or in a container 42 of an appropriate size. The sample holder 38 has an outer contact surface which is tapered at a bottom end to facilitate insertion into the housing opening. The outer contact surface of the sample holder 38 and the inner wall of the sample housing 22 are in contact along the length of the sample holder 38. The mating surfaces of the sample holder and the housing opening align the sample holder in the opening. In addition, the bottom 39 of the sample holder contacts a horizontal rim 41 formed on the sample housing (FIG. 3) thereby preventing the sample holder 38 from entering too far into the sample housing 22 and damaging the detector 36. Also, the rim 41 of the sample housing 22 and the bottom 39 of the sample holder 38 cooperate to maintain the sample holder and its receiving zone 40 fixed in relation to the detector 36 in radiation detection zone. Additionally, as will be discussed more fully below, the container 42 and sample holder 38 cooperate to position the container 42 at a fixed and reproducible vertical distance from the radiation detection zone. The cover 24 is movable from a position at the side of the receiving zone 40 permitting loading of a container 42, to a position immediately over the receiving zone 40. The cover 24 prevents external radiation, including light, from interfering with the measurement operation.

The detector subassembly 26, data input device 32, and data display 34 communicate with the main printed circuit board 30 in a conventional manner, as by ribbon cables 44, 46, and 48, respectively. Radiation emitted by a sample contained in a container 42 positioned in the sample housing 22 impinges upon the radiation detector 36 which generates a signal responsive thereto. Signals produced by the detector 36 are analyzed by a microprocessor 50 which is connected to the main printed circuit board 30. The detector 36 is shielded from environmental radiation by a radio-frequency conductive radiation shield 52. If this shield 52 is formed from any suitable beta and gamma radiation shielding material of suitable thickness, it will also shield the user from the radiation emitted by the sample. Commands entered through the data input device 32 direct operation of the microprocessor 50. Any suitable input device for entering information may function as the data input device 32.

Information processed by the microprocessor 50 may be displayed by the data display 34, which may be any conventional display means, such as an alpha-numeric LCD or CRT. An electrical connector 54 located at a back end of the apparatus 20 communicates with the microprocessor 50 and main printed circuit board 30 in a conventional manner, as by cables 56, to permit coupling of the apparatus to one or more of a family of expansion modules (not depicted). The family of expansion modules may include, for example, a print module and a high performance liquid chromatography (HPLC) flow detector. The printer module provides hard copy of data obtained from test samples. The HPLC flow detector provides data regarding a sample flow. Hard copy of data obtained from the HPLC flow detector may be obtained from the printer module.

Figure 2:
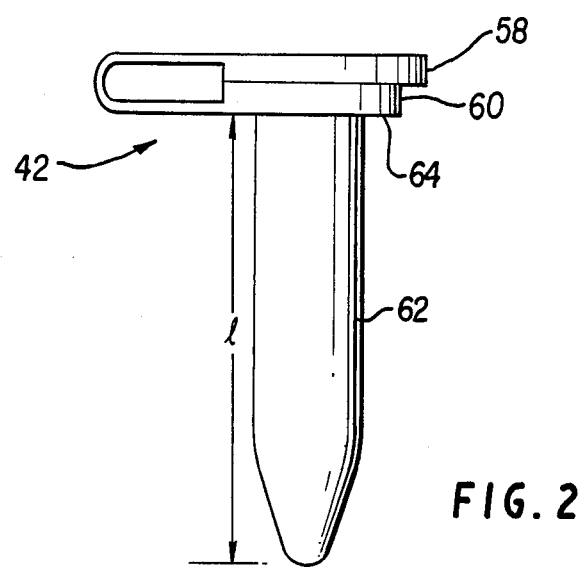
FIG. 2 is a side elevational view of a sample container for use with a radiation detection apparatus in accordance with the present invention.
Figure 3:
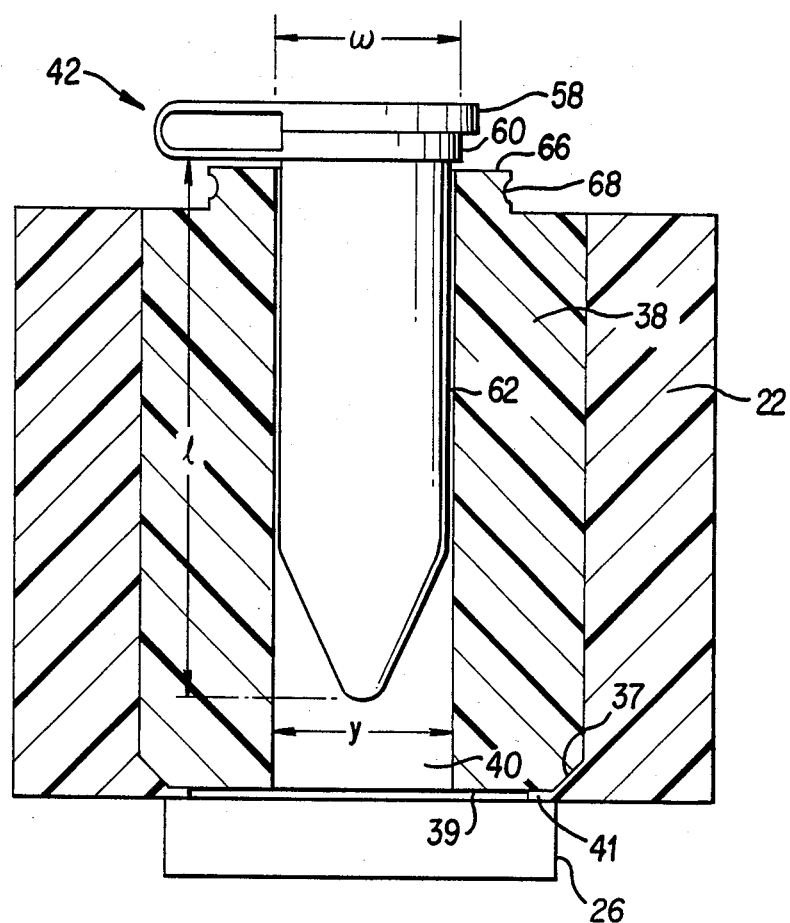
FIG. 3 is a sectional view of a sample container positioned in a sample receiving zone of a radiation detection apparatus.

The sample housing of FIG. 1 is shown in greater detail in relation to a number of different types of sample holders in FIGS. 2-9. In FIGS. 2 and 3 a sample receiving zone 40 receives a liquid sample of radiation emitting material contained in a sample vial 42 (FIG. 2). The sample requires no special sample preparation or handling, and remains intact for further use. The sample vial 42 is manually inserted into the sample receiving zone 40 of the sample holder 38 for quantitatively measuring radiation emitted by the sample contained in the vial 42. As is shown in FIGS. 2 and 3, the vial 42 includes a removable cap 58 and a base 60 having a container tube 62 of length extending therefrom. The base 60 is characterized by a width w which exceeds a width y of the sample receiving zone 40, as shown in FIG. 3. Accordingly, when the vial 42 is placed within the sample receiving zone 40, only the tube 62 of the vial 42 passes into the receiving zone 40. A lower surface 64 of the base 60 is caught and supported by an upper surface 66 of the sample holder 38, which upper surface 66 prevents the cap and base portions 58, 60 of the vial 42 from passing into the sample receiving zone 40.

The sample holder 38 can be removed from the sample housing 22 by means of grip 68 formed on the top of the sample holder 38. This enables additional sample holders (e.g. holders having receiving zones of different diameters) to be placed in the sample housing. The use of these additional sample holders permits the use of containers of various types and sizes. After a desired container size is selected, a compatible sample holder is inserted in the sample housing. The receiving zone of the compatible sample holder is sized such that only the tube of the associated vial passes into the receiving zone. A lower surface of the base of the vial is caught and supported by an upper surface of the sample holder.

After the container is placed in the receiving zone of the sample holder and the cover 24 is closed, radiation emitted by the sample can be detected by the detector 36 which generates a signal, responsive to the detection, which is quantitatively analyzed as will be discussed below. The container and the sample holder can then be removed from the sample housing 22 and a second sample holder can be inserted in the sample housing 22 to receive a different type of sample (e.g. a sample in a different type of container or in a different form such as a sample deposited on a filter). The second sample holder can be provided with a second sample receiving zone in which a second container different from the first container can be positioned or in which the sample is directly placed as in the case of a filter sample described hereinafter in detail. Radiation emitted from this sample can then be detected and analyzed to provide a radiation emission characteristic of the second sample. The removability of the sample holder thereby provides for the analysis of a variety of types of samples with one instrument.

Figure 4:
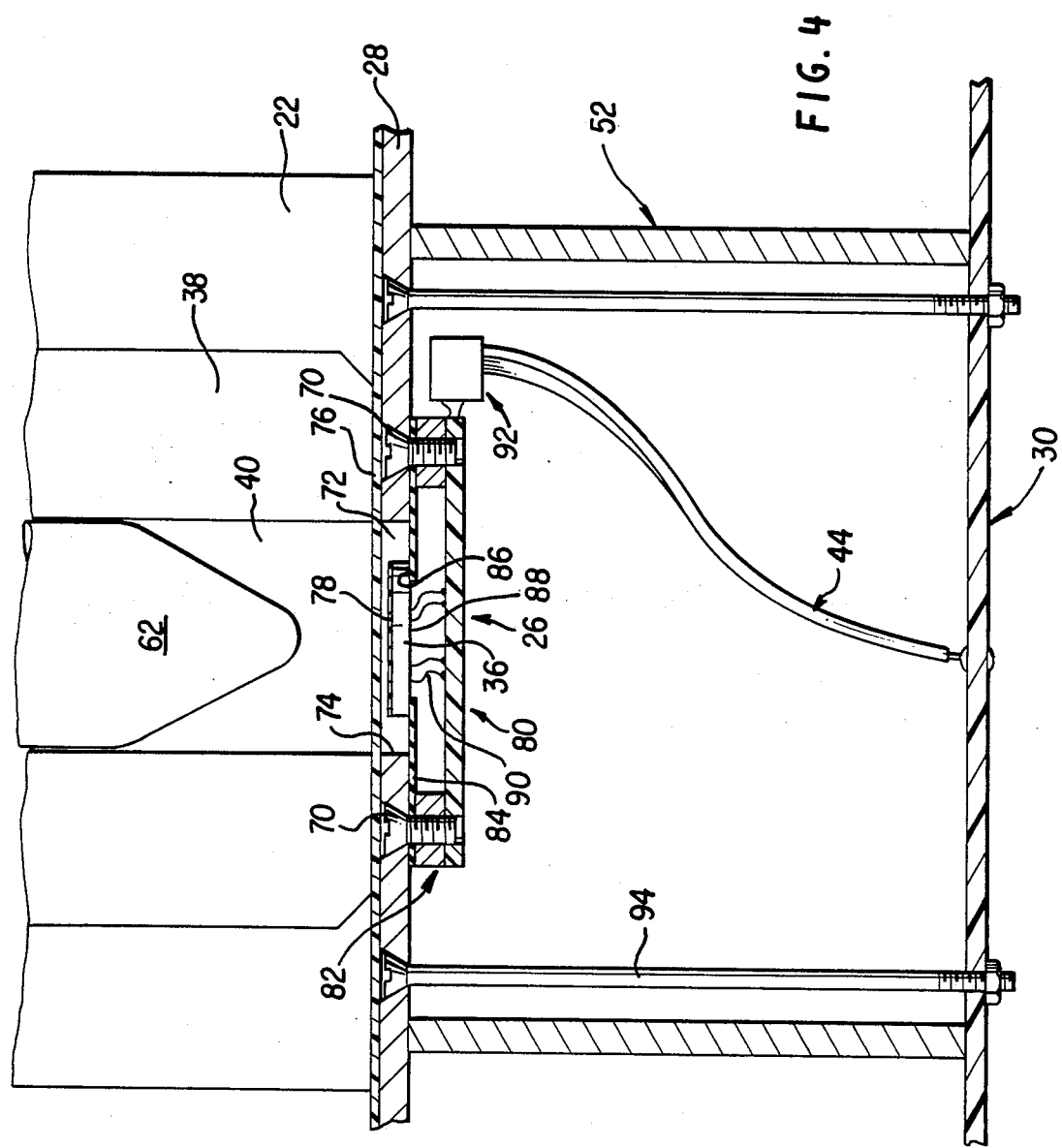
FIG. 4 is a sectional view of a detector subassembly.

FIG. 4 illustrates in greater detail the detector subassembly 26 of FIG. 1 and depicts its spatial relationship with the sample receiving zone 40. As is shown in FIG. 4, the detector subassembly 26 is positioned beneath the opening in the sample housing 22 and includes the radiation detector 36 for detecting radiation emitted by a sample positioned in the sample receiving zone 40. The sample is contained, for example, in the receiving tube 62 of the vial 42, which receiving tube 62 projects into the sample receiving zone 40 a distance corresponding to a characteristic tube length, as depicted in FIGS. 2 and 3. Accordingly, a sample placed in the sample receiving zone 40 will be spaced from the detector 36 an essentially fixed and reproducible distance, resulting in an essentially fixed sample-detector geometry which is reproducible on a sample-to-sample basis.

The detector 36 may include a solid state detector such as a PIN photodiode for detecting high-speed pulsed radiation. PIN photodiodes exhibit a large sensitive area and a high-speed response to incident radiation. Once a minimum energy threshold for incident radiation is attained, the photodiode detector 36 produces an electrical pulse related to the radiation incident to the photodiode. A PIN photodiode typically can be selected to be responsive to high energy (~1 MeV) beta and (~30 to 100 keV) gamma radiation emissions. Radiation emissions of this energy level accompany decay of $^{32}P$, $^{125}I$ and other high energy isotopes used in biological and medical research.

As is depicted in FIG. 4, the detector subassembly 26 is secured to the main housing 28 of the apparatus in a conventional manner, as by screws 70. The detector 36 is positioned in a channel 72 formed between ends 74 of the main housing 28 beneath the sample housing 22. An aluminized plastic membrane 76 interposed between the detector sub-assembly 26 and the container 42 protects the detector 36 from sample spillage. In addition, detector 36 has an additional film or plastic membrane 78 over its upper surface to protect the electrical connections to the photodetector 36. In accordance with one aspect of the present invention, the plastic membrane 78 can be replaced by localized deposits of plastic material in the vicinity of the electrical connections thereby providing an active surface free of any radiation transmission inhibiting material and permitting, in conjunction with other features of the invention described hereinafter, the detection of low energy emissions of isotopes such as $^{14}C$ and $^{45}S$. The screws 70 position a printed circuit board 80 beneath the detector 36. A spacer 82 and a washer 84 surrounding each screw 70 separates the main housing 28 from the printed circuit board 80. An inwardly directed end 86 of each washer 84 extends under a lower surface 88 of the photodiode detector 36 in order to support the detector 36 in the channel 72 above the circuit board 80. The detector 36 is electrically coupled to the circuit board 80 by conductive pins 90 extending from the lower surface 88 of the photodiode detector 36. Electrical signals produced by the detector 36 pass through the conductive pins 90 to the printed circuit board 80 where the signals are amplified, processed, and transmitted to an electrical connector 92 positioned adjacent the detector subassembly 26. The electrical signals pass from the electrical connector 92 to the main printed circuit board 30 through the ribbon cable 44, as discussed above. Ultimately, those detector signals provide data to the microprocessor 50 on the main printed circuit board 30 to permit the determination of radiation characteristics of the sample as is described hereinafter.

Surrounding the detector subassembly 26 is the radiation shield 52. The radiation shield 52 isolates the detector 36 from environmental radio-frequency radiation emitted by the unit itself and by a surrounding laboratory environment. Positioned adjacent the radiation shield 52 are support struts 94 which support the main housing 28 above the printed circuit board 30. These support struts 94 are conventional in design and may include a threaded screw and nut arrangement as depicted in FIG. 2.

Figure 5:
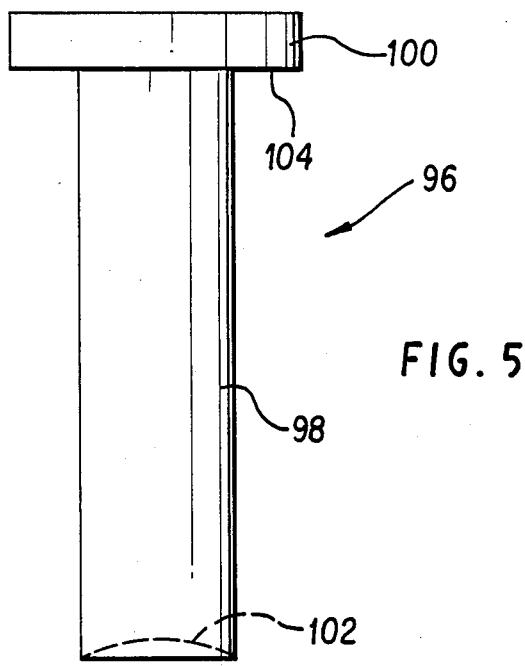
FIG. 5 is a side elevational view of another sample container for use in the preferred embodiment of the present invention.
Figure 6:
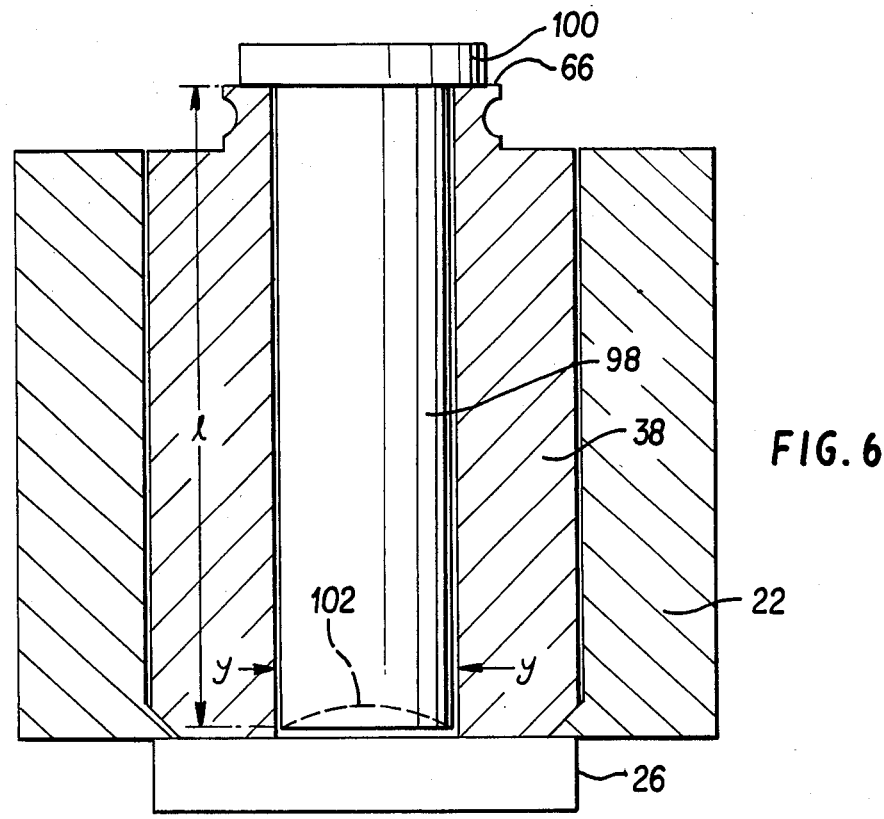
FIG. 6 is a sectional view of the sample container, of FIG. 5, positioned in a sample receiving zone of a radiation detection apparatus.

FIGS. 5 and 6 illustrate a second type of container 96 that can be used in the radiation detection apparatus of the present invention. A dry sample container 96 is formed from a body portion 98, a base 100, and a bottom surface 102. The container 96 can be inverted and a sample provided at the bottom surface 102, for example, by pipette. The sample is then allowed to dry or is dried for example by heat lamps. Once dry, the container 96 can be positioned in the holder receiving zone 40 of an appropriately sized sample holder 38. Only the body 98 of the container 96 passes into the receiving zone 40. A lower surface 104 of the base 100 is caught and supported by an upper surface 66 of the sample holder 38 so as to be prevented from passing too far into the receiving zone 40 thereby positioning the bottom surface 102 at a fixed and reproducible distance from the detector 36.

Such a sample holder and container construction permits the sample to be exposed directly to the detector subassembly 26 so that low energy radiation in the sample can be accurately detected. This results from the absence of a container wall between the sample and the detector and from the active surface of the detector being free of any radiation transmission inhibiting material. This feature combined with the removal of the plastic membrane 78 on the detector (or by the use of a proportional counter or avalanch diode detector) provides the sensitivity to detect low energy emissions from isotopes such as $^3H$, $^{14}C$, and $^{35}S$.

It is to be understood that the use of a vial 42, as discussed above and shown in FIGS. 2-4, provides sufficient exposure of a sample to the detector 36 where high energy Beta and Gamma isotopes such as $^{32}P$ and $^{125}I$ are used. In addition, sample material retained in a vial 42 during testing can be used after testing for other purposes. Therefore, many advantages exist for using vials as sample containers where high energy emissions are being measured, although the sample container may be of the type described above which would increase the detection sensitivity for high energy emitters.

However, when it is desired to measure the emissions of isotopes such as $^3H$, $^{14}C$, and $^{35}S$ in the apparatus, it is necessary to provide the sample at the detector 36 without the obstruction of a vial wall therebetween. This is accomplished through the provision of dry sample container 96. Since both types of containers 42, 96 are usable with the device through the provision of replaceable sample holders, the apparatus can be used to measure the emissions of isotopes of all energy levels.

Figure 7:
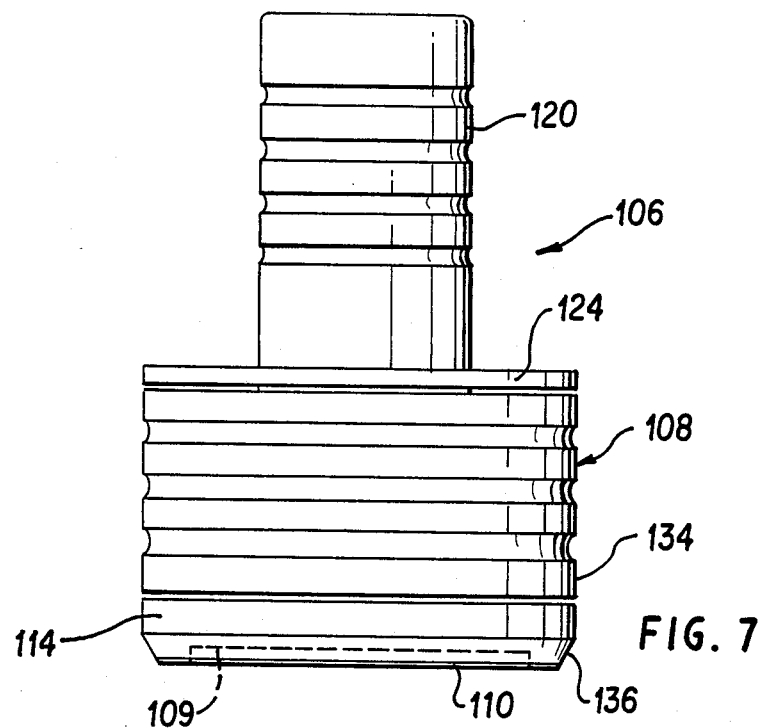
FIG. 7 is a side elevational view of a filter sample holder for use with the radiation detection apparatus of the present invention.
Figure 8:
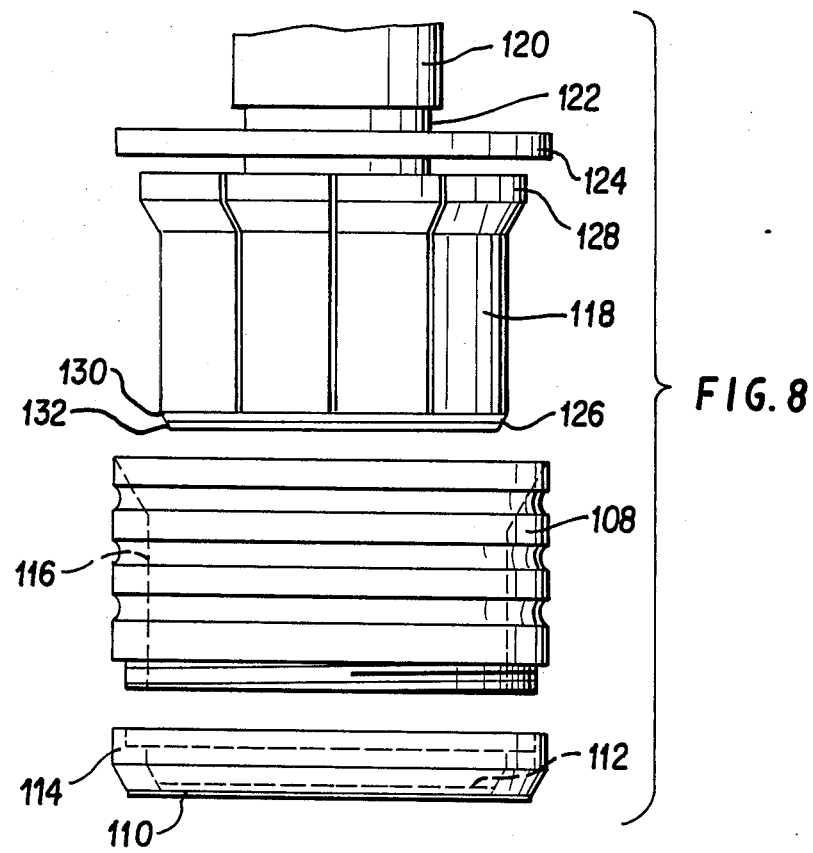
FIG. 8 is partial side view of a disassembled filter sample holder of the type shown in FIG. 7.
Figure 9:
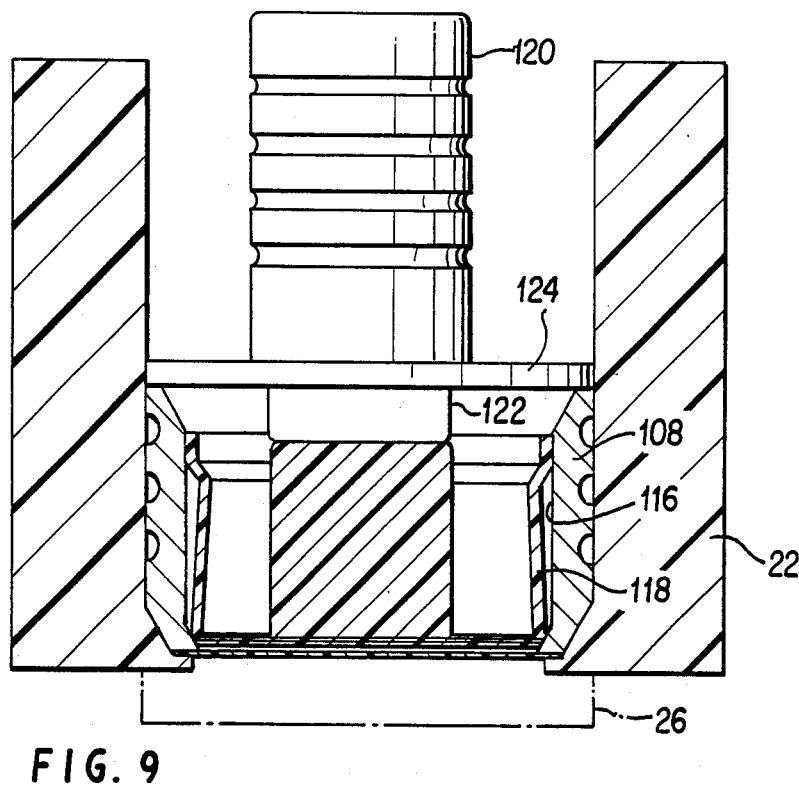
FIG. 9 is a sectional view of the filter sample holder of FIG. 7 positioned in a sample receiving zone of a radiation detection apparatus.

FIGS. 7-9 illustrate yet another type of sample holding device 106 which can be used with the disclosed radiation detection apparatus to detect radiation of samples deposited on a filter. The filter sample holding device 106 comprises a body portion 108 of generally cylindrical shape. A plastic membrane 110 such as aluminized mylar covers one end of the body portion 108 and provides a resting surface 112 on which a sample filter is placed. The plastic membrane 110 can be provided on a separate detachable ring element, such as screw ring 114 or a snap in ring comprising a copper outer ring with the membrane 110 stretched there across and bonded thereto, thereby enabling the plastic membrane 110 to be removed for cleaning or replacement. In the case of a snap-in ring (not shown), the bottom of the body portion 108 can be provided with a machined, annular groove to receive the ring with a snap-in frictional fit for easy insertion and removal as indicated in phantom at 109. Alternatively, the plastic membrane may be glued to the bottom of the body member to cover the opening therethrough.

The inner surface 116 of the container body 108 converges at the end near the plastic membrane 110 to facilitate positioning of a filter on the resting surface 112. In addition, the inner suface 116 of the container body 108 opens toward the outer surface of the body portion at the open end of the body. This facilitates the positioning of a plug element 118 in the body 108. The plug element 118 is made of a resilient material and is attached to a handle 120 through a throat section 122. An annular ring 124 is slidably supported on the throat 122 and is captured between the handle 120 and resilient plug 118. The plug 118 is tapered at its lower end 126 and has an extended circumference at its upper end 128. The plug 118 can additionally be provided with a layer of lead 130 on the bottom surface thereof. This lead layer 130 absorbs high energy beta radiation moving away from the detector and reemits x-rays, some of which the detector 36 can detect. A thin, replaceable plastic layer 132 can be applied over the lead layer 130 to protect it from possible contamination.

A filter that has been employed to collect a sample of a radiation emitting material is placed on the resting surface 112 of the container body portion 108. The plug 118 is then inserted into the body portion 108, the bottom surface of the plug coming in close contact with the filter to position the filter between the plastic membrane 110 and the plastic coated lead 132, 130 layer of the plug 118.

The extended circumference of the plug 118 resiliently wedges against the inner wall 116 of the container body 108 providing a tight fit between the plug 118 and the container body 108 enabling the container 106 to be gripped and handled by handle 120. The annular ring 124 is pushed toward the handle 120 when the plug 118 is inserted in the container body 108 giving the user the sensation of a snap fit between the plug 118 and the container body 108 and preventing the plunger from pushing the filter through the membrane or crushing the filter by providing a stop which prevents further insertion To remove the plug 118 from the container body 108, the annular ring 124 is pressed downward with respect to the handle 120 thereby wedging the plug 118 from its frictional engagement with the inner wall 116 of the container body 108. The filter can then be lifted out of the holding device 106 and the plastic membrane 110 and plastic coating 132, if contaminated, can be replaced, and the holding device 106 can be used with another filter.

When the sample holding device 106 is placed in the sample housing 22, no separate sample holder is employed. Instead the device 106 itself is sized such that its outer wall 134 forms a contact surface cooperating with the inner surface of the opening in the sample housing 22, and the annular ring 124 holds the plug 118 at a fixed and reproducible distance from the membrane 110 to prevent the plug from damaging the filter sample. As with the construction of the sample holders and the housing opening previously described, the above construction provides accurate and reproducible positioning of the sample with respect to the detector.

Figure 10:
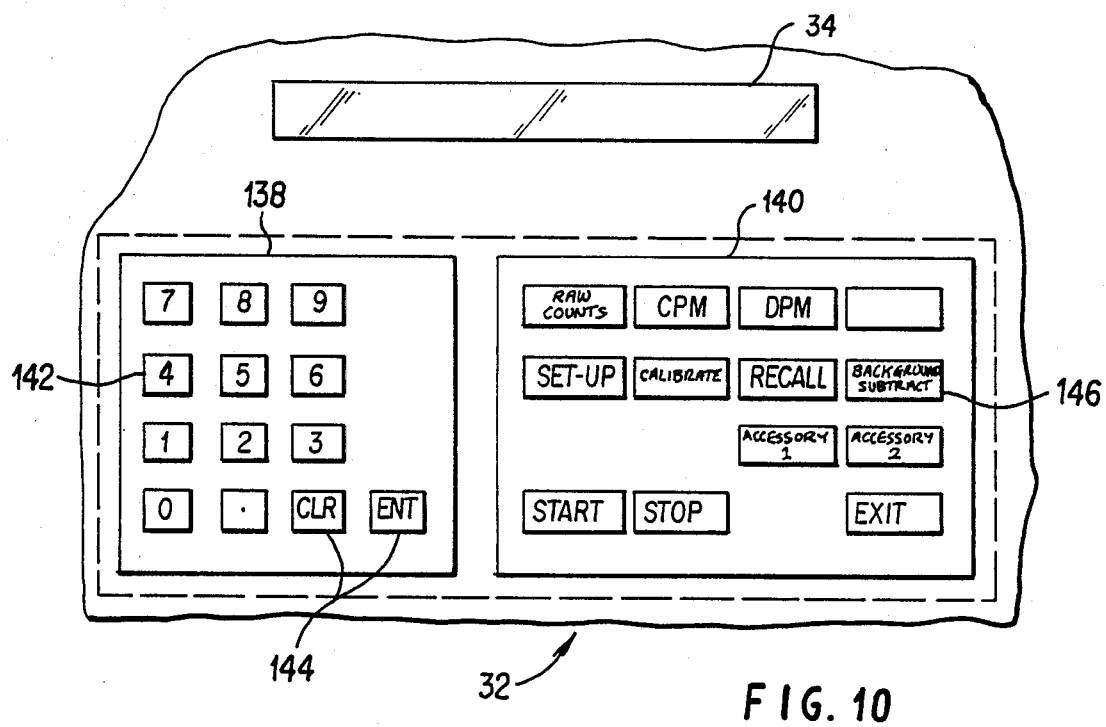
FIG. 10 is an overhead view of data input and data display means.

FIG. 10 illustrates a preferred embodiment of the data input device 32. The input device may be any conventional data input means such as a keyboard. As shown in FIG. 10, the preferred keyboard arrangement includes two major work areas: a digital keypad 138 and a program command center 140. The digital keypad 138 includes a plurality of numeric keys 142 for inputting numeric data to the microprocessor 50. Data keyed through the digital keypad 138 is displayed by the data display 34 positioned adjacent the keyboard. The data display may include any conventional data display means, such as an alpha-numeric LCD. The displayed data may be stored temporarily, e.g. in a register, and entered into the microprocessor when an appropriate functional key 144 such as the key designated "enter" is depressed. Errors in numeric data may be corrected prior to entry into the microprocessor by depressing an appropriate functional key 144 of the digital keypad 138 such as the key labelled "clear".

The program command center 140 preferably includes a plurality of program command keys 146 for directing program control of microprocessor functions. These functions include detector calibration and quantitative measurement of radiation emitted by a test sample expressed in counts per minute (CPM) and disintegrations per minute (DPM).

FIGS. 11 to 13 functionally illustrate the microprocessor 50 and its operation. As shown in FIG. 11, the microprocessor comprises a CPU with associated random access memory (RAM) and read only memory (ROM) in a conventional arrangement. The CPU communicates with the data input/output devices (e.g. the keyboard and the display) in a conventional manner and the ROM containing the program is sequenced through its program steps in the usual manner.

As is illustrated in FIG. 12, a preselected radiation emission characteristic of a known sample is determined as a calibration value for subsequent evaluation of an unknown samle. Detector calibration is accomplished by inserting a container 42, 96 or 106 containing a reference sample of known activity and volume into the sample housing 22. The activity of the reference sample, expressed in disintegrations per minute (DPM) is entered into the random access memory (RAM) of the microprocessor 50 for subsequent recall, as illustrated in FIG. 11. The activity of the reference sample is determined and stored in the RAM as a measure in CPM. The microprocessor then bomputes a calibration value C·as follows:

$$C = DPM/CPM$$

or $$C = CPM/DPM$$

The calibration value is stored in the RAM for use in further evaluation of unknown samples. In particular, the value C is used to correct quantitative radiation emission data obtained from radiation-emitting samples. The calibration value C preferably is determined as a function of CPM/DPM as in the second equation above because this always yields a value less than one (1) and such a value is easier to handle for display and processing purposes.

Once the detector 36 has been calibrated, quantitative radiation emission data may be obtained from radiation emitting samples of unknown activity. A quantity of an unknown sample, x, substantially identical to that of the reference sample is collected in or on a container, 42, 96 or 106 and counted by the detector 36. Data obtained from the unknown sample is usually expressed in counts per minute. An indication of sample activity, $DPM_x$, is obtained using the stored calibration value C a follows:

$$DPM=(C)\times(CPM_x)$$

or $$DPM=(1/C)\times CPM_x \text{ (For C less than 1)}$$

where $CPM_x$ is a measure in counts per minute of radiation emissions from an unknown sample, x.

$CMP_x$ may be obtained from one of two methods. In a first method, the user may specify a total number of counts to be accumulated by the detector corresponding to a desired statistical precision. This total number of counts is entered into the RAM through the numeric keys 142 of the digital keypad 138 and an appropriate program command key 146. When the selected number of counts is attained (or after a maximum counting time has elapsed if the total number of counts has not been reached.), the microprocessor 50 terminates detection counting, notes the total elapsed counting time, then computes $CPM_x$ as follows:

$$CPM_x=CTS/T_x$$

where CTS represents the predetermined total number of counts and $T_x$ represents the total time elapsed to obtain CTS.

Alternatively, $CPM_x$ may be obtained by counting radiation emissions for a pre-determined time $T_x$ where the counts CTS are unknown. The appropriate program and time parameters are entered into the microprocessor 50 as above. Following expiration of this selected time period, the microprocessor registers the total number of counts and computes the value of $CPM_x$ as follows:

$$CPM_x=CTS/T_x$$

Once $CPM_x$ has been determined from any of the above-discussed methods, the activity for the unknown sample ($DPM_x$) may be obtained from the calibration value C as follows:

$$DPM_x=(C)\times(CPM_x)$$

or $$DPM_x=(1/C)\times CPM_x \text{ (for C less than 1)}$$

The determination of $DPM_x$ is obtained from selecting an appropriate program command key 146 of the program command center.

Radiation emission characteristics expressed in CPM or DPM may be displayed by the data display 34, which may include an alpha-numeric LCD positioned adjacent to the data input device 32, as shown in FIG. 10. The data display 34 receives signal input from the microprocessor 50 and the data input device 32 to provide an indication of a particular radiation emission characteristic for a sample of radiation-emitting material.

In addition to the foregoing, radiation emissions may be evaluated and displayed by a family of expansion modules adapted to communicate with the radiation measuring apparatus 20. Communication between an expansion module and the apparatus is provided by the electrical connector 54 located at a back end of the apparatus. The electric connector 54 includes a microprocessor bus and communicates with the microprocessor 50 through the connector cables 56 which carry signal input between the electrical connector 54 and the microprocessor 50. Signal input may include data and program control information. When additional ROM from an expansion module is connected to the connector 54, program control of the microprocessor 50 may be directed by the expansion module. In the absence of additional ROM from an expansion module, program control of microprocessor functions is directed by a ROM associated with the microprocessor, as depicted in FIG. 11.

The family of expansion modules may include a high performance liquid chromatograph (HPLC) flow detector and a printer. The HPLC flow detector includes a conventional flow cell, radiation detector and analog circuitry. The detector may also be provided with an additional ROM. The flow detector accommodates radiation emitting samples in which radiation emissions may vary as a function of time. Data obtained from flowing samples is supplied to and processed by the microprocessor 50 via the connector 54, and the results may be displayed by the data display 34 unless otherwise directed by the program command center 140.

The printer module includes a printing means such as an inexpensive dot matrix thermal printer for providing hard copy of data obtained from a measured sample through a communication port such as an RS232 port or a parallel Centronics port which receives signal input from the microprocessor 50. Dip switches associated with the printer module may provide for selection of an appropriate data transmission rate from the microprocessor 50, where necesary. Hard copy of data obtained from either the detector 36 or the HPLC flow detector may be printed by the printer module, if desired.

It will be seen that the objects set forth above, among those made apparent from the preceding description, are efficiently attained and, since certain changes may be made in the construction and in carrying out the above method without departing from the scope of the invention, it is intended that all matters contained in the above description or shown in the accompanying drawings shall be interpreted as illustrative only and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A portable, bench top radiation detection apparatus for quantitative analysis of radio-active samples comprising:
   a housing having an opening leading to a radiation detecting zone;
   sample holding means removably mounted in said opening in fixed relation to said radiation detecting zone for receiving a sample container containing a radiation-emitting sample and positioning said sample container to present the sample in fixed relation to said radiation detecting zone
   a radiation detector mounted in said radiation detecting zone for detecting radiation emitted by said radiation emitting sample;

signal analyzing means responsive to said radiation detector for quantitatively analyzing radiation emitted by said radiation-emitting sample; and means responsive to said signal analyzing means or displaying a radiation emission characteristic for said radiation-emitting sample.

2. The portable, bench top radiation detection apparatus of claim 1 wherein said signal analyzing means comprises means for storing a value related to a pre-selected radiation emission characteristic of a known radiation-emitting sample positioned in said sample receiving zone, and means responsive to said stored value for analyzing radiation emissions from a different sample placed in said sample receiving zone, said displaying means displaying said radiation emission characteristic for said different sample.

3. The portable, bench top radiation detection apparatus of claim 2, wherein said radiation detector is a solid state PIN photodiode.

4. The portable, bench top radiation detection apparatus of claim 2, wherein said pre-selected radiation emission characteristic is a calibration factor related to said radiation emission characteristics for said known radiation-emitting sample.

5. The portable, bench top radiation detection apparatus of claim 2, wherein said pre-selected radiation emission characteristic represents a calibration factor C relating a known radiation emission characteristic measured in disintegrations per minute (DPM) to a detected radiation emission characteristic expressed in counts per minute (CPM) for said known radiation emitting sample in accordance with the expression:

6. The portable, bench top radiation detection apparatus of claim 1, wherein said radiation detector is planar and is positioned in said radiation detecting zone at one end of said opening.

7. The portable, bench top radiation detection apparatus of claim 1, wherein said radiation detector is a solid state diode.

8. The portable, bench top radiation detection apparatus of claim 1 including means positionable over said opening in said housing for blocking the light from at least directly entering said opening.

9. The portable, bench top radiation detection apparatus of claim 1, wherein said apparatus includes connection means providing communication with at least one expansion module.

10. The portable, bench top radiation detection apparatus of claim 9, wherein said at least one expansion module includes means for communicating with at least one other expansion module.

11. The portable, bench top radiation detection apparatus of claim 1, wherein said means for displaying is a digital display means.

12. The portable, bench top radiation detection apparatus of claim 1, wherein said means for displaying is an alpha-numeric liquid crystal display.

13. The portable, bench top radiation detection apparatus of claim 1, wherein said signal analyzing means includes a data input keyboard.

$$DPM = (C) \times (CPM)$$

or $$DPM = (1/C) \times (CPM).$$

14. The portable, bench top radiation detection apparatus of claim 1, wherein said radiation detector is responsive to high and low energy radiation emissions.

15. The portable, bench top radiation detection apparatus of claim 1, wherein said sample holding means includes a sample holder comprising an elongated member having an opening approximately through the center thereof along the longitudinal axis, said opening in the sample holder being configured to cooperate with a container of particular dimensions so as to position the container in fixed relation to the radiation detector.

16. The radiation detection apparatus according to claim 15, wherein said sample holder includes means for permitting gripping of said sample holder at one end thereof and means at an opposite end thereof to position said sample holder in said sample housing when said sample holder is placed in said sample housing.

17. The portable, bench top radiation detection apparatus according to claim 15, wherein a surface of said sample holder is configured to cooperate with a surface of said housing to position the sample holder receiving zone in a fixed relation to said radiation detection zone.

18. The portable, bench top radiation detection apparatus of claim 1, wherein said sample holding means comprises a removable sample holder, said apparatus being adapted to receive any one of a plurality of sample holders, each being adapted to be removably mounted in said opening in said housing in fixed relation to said radiation detecting zone and each being configured to receive a different type of sample container and to position said sample container in fixed relation to said detecting zone.

19. The portable, bench top radiation detection apparatus according to claim 1, wherein said sample holding means comprises a sample holder configured to receive the sample container, said container including; a container body having a base at one end and a bottom surface at an opposite end, said base having a contact surface, said sample holder having a bottom and an upper surface, said upper surface defining said container positioning means for cooperation with said container, said upper surface of said sample holder and said contact surface of said base mating to position said sample mounting surface at a fixed distance from said bottom of said sample holder.

20. The portable, bench top radiation detection apparatus according to claim 1, wherein said sample holding means comprises a sample holder configured to receive the sample container, said container including;

a vial means for holding a sample to be tested, a cap at one end of said vial means to cover the vial means to prevent spillage of a sample, and a base having a contact surface, said base being at the same end of said vial means as said cap, said sample holder having a bottom and an upper surface, said upper surface defining said container positioning means for cooperation with said at least one container, said upper surface of said sample holder and said contact surface of said base mating to position said vial body in said sample receiving zone at a fixed distance from said bottom of said sample holder.

21. A portable, bench top radiation detection apparatus according to claim 1, wherein said sample holding means comprises a filter sample holder and said sample container comprises a filter, said filter sample holding means having a first contact surface and a filter mounting surface, said apparatus further comprising:

a second contact surface formed in said sample housing opening, said second contact surface mating with said first contact surface when said filter sample holding means is inserted in said sample housing, said filter sample holding means being effective when inserted in the sample housing to removably position said sample mounting surface and said sample container at a fixed distance from said radiation detecting zone.

22. A portable, bench top radiation detection apparatus for quantitative analysis of radioactive samples comprising:

a housing having an opening leading to a radiation detecting zone;

sample holding means removably mounted in said opening in fixed relation to said radiation detecting zone for receiving a radiation-emitting sample and positioning said sample in fixed relation to said radiation detecting zone;

a radiation detector mounted in said radiation detecting zone for detecting radiation emitted by said radiation-emitting sample, said radiation detector comprising a solid state diode with an active surface substantially free of any radiation transmission-inhibiting material;

signal analyzing means responsive to said radiation detector for quantitatively analyzing radiation emitted by said radiation-emitting sample; and means responsive to said signal analyzing means for displaying a radiation emission characteristic for said radiation-emitting sample.

23. The portable, bench top radiation detection apparatus of claim 22 wherein said sample holding means includes a sample holder configured to receive a disposable container with a bottom surface having a dried sample thereon, said bottom surface being spaced from and in direct communication with said detector with said container mounted in said sample holder.

24. The portable, bench top radiation detection apparatus of claim 23 wherein said radiation detector is responsive to low energy radioisotope emissions.

25. A portable, bench top radiation detection apparatus for quantitative analysis of radioactive samples comprising:

a housing having an opening leading to a radiation detecting zone;

sample holding means removably mounted in said opening in fixed relation to said radiation detecting zone for receiving a radiation-emitting sample and positioning said sample in fixed relation to said radiation detecting zone;

a radiation detector mounted in said radiation detecting zone for detecting radiation emitted by said radiation-emitting sample, said sample holding means includes a sample holder configured to receive a disposable container with a bottom surface having a dried sample thereon, said bottom surface being spaced from and in direct communication with said detector with said container mounted in said sample holder;

signal analyzing means responsive to said radiation detector for quantitatively analyzing radiation emitted by said radiation-emitting sample; and means responsive to said signal analyzing means for displaying a radiation emission characteristic for said radiation-emitting sample.

26. The portable, bench top radiation detection apparatus of claim 25 wherein said radiation detector is responsive to low energy radioisotope emissions.

27. A portable, bench top radiation detection apparatus for quantitative analysis of radioactive samples comprising:

a housing having an opening leading to a radiation detecting zone;

sample holding means removably mounted in said opening in fixed relation to said radiation detecting zone for receiving a radiation-emitting sample and positioning said sample in fixed relation to said radiation detecting zone;

a radiation detector mounted in said radiation detecting zone for detecting radiation emitted by said radiation-emitting sample, said radiation detector being responsive to $^{32}P$ and $^{125}I$ isotope decay emissions;

signal analyzing means responsive to said radiation detector for quantitatively analyzing radiation emitted by said radiation-emitting sample; and means responsive to said signal analyzing means for displaying a radiation emission characteristic for said radiation-emitting sample.

28. A sample container for use in a portable, bench top radiation detection apparatus, said sample container comprising:

a body portion and a base portion, said base portion being connected to said body portion at one axial end of the body portion, said body portion including a sample receiving surface adapted to support a dried radioactive sample thereon, said sample receiving surface being integral with said body portion at an opposite axial end of the body portion from said base portion and having a concave configuration.

29. A filter sample holding means for use in a portable bench top radiation detection apparatus, said filter sample holding means comprising:

a body portion having a filter mounting surface, a plug means having a pressing means, said plug means being removably inserted in said body means to hold a filter sample on said filter mounting surface, and means to properly position said plug means in said body portion to provide said pressing means at said mounting surface.

30. The filter sample holding means according to claim 29, wherein, said body portion is hollow and includes, two axial ends, a first of said axial ends being open and the second being closed by a membrane element through which radiation can pass, said second axial end defining said filter mounting surface at an inner surface of said membrane, an outer side wall defining a first contact surface and an inner wall defining a second contact surface, said inner side wall having an area at said second axial end which converges toward the center of said sample mounting surface, said plug means further including, a first axial end and a second axial end, a handle mounted at said first axial end and said pressing means being mounted at said second axial end, a resilient outer wall defining a plug contact surface and being tapered at said second end, an annular ring on said plug means slidably held between said handle and said resilient outer wall, said plug being insertable in said body portion to provides aid pressing element at said filter mounting surface so as to hold a filter sample on the mounting surface adjacent said membrane, said plug contact surface being frictionally engaged with said second contact surface when said plug is inserted in said body portion, said annular ring abutting said body portion at said open axial end and being captured between said handle and said body portion to provide the pressing means at a fixed distance from said membrane and to close the first axial end of said body portion.

31. A method for quantitatively analyzing radiation-emitting samples in a portable, bench top radiation detection apparatus comprising the steps of:
   inserting a first sample holder having a first sample receiving zone into an opening in the apparatus leading to a radiation detecting zone;
   inserting a first container containing a first radiation-emitting sample into the first sample receiving zone of the first sample holder;
   detecting radiation emitted by said first radiation-emitting sample into said radiation detecting zone and generating a first signal responsive to said detected radiation;
   quantitatively analyzing the radiation emitted by said first sample in response to said first signal;
   removing said first container and said first sample holder;
   inserting a second sample holder having a second sample receiving zone into the opening in the apparatus leading to the radiation detecting zone, the second sample receiving zone of the second sample holder being configured to receive a second container different from said first container;
   inserting into the sample receiving zone of said second sample holder a second container containing a second radiation-emitting sample;
   detecting radiation emitted by said second radiation-emitting sample into said radiation detecting zone and generating a second signal responsive to said detected radiation;
   quantitatively analyzing the radiation emitted by said second sample in response to said second signal; and
   displaying a radiation emission characteristic for said second sample.

32. The method for quantitatively analyzing radiation-emitting samples in a portable, bench top radiation detection apparatus of claim 31, wherein each of said first and second containers is positioned relative to a detector of radiation so as to obtain an essentially fixed sample-detector spatial relationship.

33. The method for quantitatively analyzing radiation-emitting samples in a portable, bench top radiation detection apparatus of claim 31, wherein said detected radiation for said first and second samples comprises different energy levels of radiation.

34. The method for quantitatively analyzing radiation-emitting samples in a portable, bench top radiation detection apparatus of claim 31, wherein said detected radiation comprises $^{32}P$ and $^{125}I$ isotope emissions.

35. A method for quantitatively analyzing radiation-emitting samples in a portable, bench top radiation detection apparatus of claim 31, wherein said radiation detector is a solid state diode detector.

36. The method for quantitatively analyzing radiation-emitting samples in a portable, bench top radiation detection apparatus of claim 31, wherein said radiation detector is a solid state PIN photodiode.

37. The method for quantitatively analyzing radiation-emitting samples in a portable, bench top radiation detection apparatus of claim 31, wherein each of said samples is analyzed in relation to a pre-selected radiation emission characteristic communicated to a memory means by a data input keyboard.

38. The method for quantitatively analyzing radiation-emitting samples in a portable, bench top radiation detection apparatus of claim 31, wherein each of said samples is analyzed in relation to a pre-selected radiation emission characteristic indicative of radioactivity in a known radiation emitting sample expressed in disintegrations per minute (DPM).

39. The method for quantitatively analyzing radiation-emitting samples in a portable, bench top radiation detection apparatus of claim 37, wherein said preselected radiation emission characteristics is a calibration constant C relating a known radiation emission characteristic expressed in disintegrations per minute (DPM) to a detected radiation emission characteristic expressed in counts per minute (CPM) for a known sample in accordance with the expression $$DPM = C \times CPM.$$

40. The method for quantitatively analyzing radiation-emitting samples in a portable, bench top radiation detection apparatus of claim 31, wherein an alphanumeric liquid crystal display is used for displaying said radiation emission characteristic.

41. A method for quantitatively analyzing radiation-emitting samples in a portable, bench top radiation detection apparatus comprising the steps of:
   (a) inserting a first container containing a known radiation-emitting sample into a sample receiving zone of a first sample holder which positions said first containr relative to a detector of radiation so as to obtain an essentially fixed sample-detector spatial relationship;
   (b) detecting radiation emitted by said known radiation-emitting sample and generating a signal responsive to said detected radiation;
   (c) quanttitatively analyzing said radiation emitted by said known radiation-emitting sample with respect to at least one preselected radiation emission characteristic stored in a memory means;
   (d) removing said first container and inserting a second container containing an unknown radiation-emitting sample into the sample receiving zone of the first sample holder which positions said second container relative to the detector so as to obtain the essentially fixed sample-detector spatial relationship;
   (e) detecting radiation emitted by said second radiation emitting sample and generating a second signal responsive to said detected radiation;
   (f) quantitatively analyzing said radiation emitted by said second radiation-emitting sample with respect to said at least one pre-selected radiation emission characteristic;
   (g) displaying a radiation emission characteristic for said second radiation-emitting sample;
   (h) removing said second container and said first sample holder;

(i) inserting a second sample holder having a sample receiving zone into said apparatus; and (j) repeating steps (a) through (g) for third and fourth samples in third and fourth containers, respectively.

42. The method for quantitatively analyzing radiation-emitting samples in a portable, bench top radiation detection apparatus of claim 41, wherein said detected radiation comprises high energy beta and gamma radiation as well as low energy beta radiation.

43. The method for quantitatively analyzing radiation-emitting samples in a portable, bench top radiation detection apparatus of claim 41, wherein said detector of radiation is a solid state diode detector.

44. The method for quantitatively analyzing radiation-emitting samples in a portable, bench top radiation detection apparatus of claim 41, wherein said pre-selected radiation emission characteristic is communicated to said memory means by a data input keyboard.

45. The method for quantitatively analyzing radiation-emitting samples in a portable, bench top radiation detection apparatus of claim 41, wherein one of said pre-selected radiation emission characteristics is a calibration constant C relating a known radiation emission characteristic expressed in disintegrations per minute (DPM) to a detected measurement expressed in counts per minute (CPM) for said known sample in accordance with the expression:

$$DPM = C \times CPM.$$

46. A portable, bench top radiation detection apparatus for quantitative analysis of radiation-emitting samples comprising:
a substantially light-tight enclosure having an opening into the interior thereof and containing a radiation detector mounted therein;
sample holding means removably mounted in said enclosure in fixed relation to the radiation detector for receiving a sample container containing a radiation-emitting sample and positioning said sample container to present the sample in fixed spatial relation to said detector;
signal analyzing means responsive to said radiation detector for quantitatively analyzing radiation emitted by said radiation-emitting sample; and
means responsive to said signal analyzing means for indicating a radiation emission characteristic for said radiation-emitting sample.

47. The portable, bench top radiation detection apparatus of claim 46 wherein said radiation detector is a solid state diode and wherein said enclosure includes means adjacent said sample receiving zone for blocking incident light from entering said zone.

48. The portable, bench top radiation detection apparatus of claim 46 wherein said sample holding means comprises a sample holder configured to receive a container which is adapted to hold a radioactive sample, said container including an elongated member insertable into said sample receiving zone in fixed relation to said detector, the portion of said member adjacent said detector having a surface in direct communication with said detector for receiving and drying a liquid sample.

49. The portable, bench top radiation detection apparatus of claim 46 wherein said signal analyzing means includes a data input keyboard.

50. The portable, bench top radiation detection apparatus of claim 46 including means for storing a calibration factor C relating a known radiation emission characteristic expressed in disintegrations per minute (DPM) to a detected radiation emission characteristic expressed in counts per minute (CPM) for a known radiation-emitting sample in accordance with the expression:

$$DPM = C \times CPM.$$

51. The portable, bench top radiation detection apparatus of claim 46 wherein said opening in said enclosure is substantially vertically disposed and said sample holding means comprises an insert with an interior sample receiving zone for receiving the sample container in a substantially vertical position, said detector comprising a substantially planar radiation detector disposed immediately beneath the lower end of the sample container with the container inserted into the sample receiving zone of the sample holding means.

52. The portable, bench top radiation detection apparatus of claim 46 wherein said sample holding means includes:
a body portion having a filter mounting surface,
a plug means having a pressing means, said plug means being removably inserted in said body means to hold a filter sample on said filter mounting surface, and
means to properly position said plug means in said body portion to provide said pressing means at said mounting surface.

53. A portable, bench top radiation detection apparatus for quantitative analysis of radiation-emitting samples comprising:
a substantially light-tight enclosure having an opening into the interior thereof and containing a radiation detector mounted therein, said radiation detector comprising a solid state diode with an active surface substantially free of any radiation transmission-inhibiting material;
sample holding means removably mounted in said enclosure in fixed relation to the radiation detector for receiving a radiation-emitting sample and positioning said sample in fixed spatial relation to said detector;
signal analyzing means responsive to said radiation detector for quantitatively analyzing radiation emitted by said radiation-emitting sample; and
means responsive to said signal analyzing means for indicating a radiation emission characteristic for said radiation emitting sample.

54. The portable, bench top radiation detection apparatus of claim 53 wherein said sample holding means comprises a sample holder configured to receive a disposable container with a bottom surface having a dried sample thereon, said bottom surface being spaced from and in direct communication with said detector with said container mounted in said sample holder.

55. The portable, bench top radiation detection apparatus of claim 54 wherein said radiation detector is responsive to low energy radioisotope emissions.

56. A portable, bench top radiation detection apparatus for quantitative analysis of radiation-emitting samples comprising:
a substantially light-tight enclosure having an opening into the interior thereof and containing a radiation detector mounted therein;
sample holding means removably mounted in said enclosure in fixed relation to the radiation detector for receiving a radiation-emitting sample and positioning said sample in fixed spatial relation to said detector, said sample holding means comprising a sample holder configured to receive a disposable container with a bottom surface having a dried sample thereon, said bottom surface being spaced from and in direct communication with said detector with said container mounted in said sample holder;

signal analyzing means responsive to said radiation detector for quantitatively analyzing radiation emitted by said radiation-emitting sample; and means responsive to said signal analyzing means for indicating a radiation emission characteristic for said radiation-emitting sample.

57. The portable, bench top radiation detection apparatus of claim 56 wherein said radiation detector is responsive to low energy radioisotope emissions.

58. A portable, bench top radiation detection apparatus for quantitative analysis of radiation-emitting samples comprising:

a substantially light-tight enclosure having an opening into the interior thereof and containing a radiation detector mounted therein, said radiation detector being responsive to $^{32}P$ and $^{125}I$ isotope decay emissions;

sample holding means removably mounted in said enclosure in fixed relation to the radiation detector for receiving a radiation-emitting sample and positioning said sample in fixed spatial relation to said detector;

signal analyzing means responsive to said radiation detector for quantitatively analyzing radiation emitted by said radiation-emitting sample; and means responsive to said signal analyzing means for indicating a radiation emission characteristic for said radiation-emitting sample.

59. A portable, bench top radiation detection apparatus for quantitative analysis of radioactive samples contained in containers of differing types, comprising:

a housing having a housing opening leading to a radiation detecting zone;

a radiation detector mounted in said radiation detecting zone for detecting radiation emitted by radioactive samples;

a sample holder removably mounted in said housing opening in fixed relation to said radiation detecting zone, said sample holder having a holder opening;

a sample container dimensioned to be received and supported in said holder opening so as to be positioned in fixed relation to the radiation detector.

* * * * *